United States Patent [19]
Affolter et al.

[11] Patent Number: 5,510,869
[45] Date of Patent: Apr. 23, 1996

[54] PHOTOGRAPHIC FILM PACKET AND LIGHT LOCKING ELEMENT

[75] Inventors: Peter Affolter, Hilton; Peter C. Runke, Scottsville; Joseph H. Prato, Victor, all of N.Y.

[73] Assignee: Eastman Kodak Company, Rochester, N.Y.

[21] Appl. No.: 220,758

[22] Filed: Mar. 30, 1994

[51] Int. Cl.$^6$ .................................................. G03B 17/26
[52] U.S. Cl. ............................................................ 354/282
[58] Field of Search ................................. 354/276, 277, 354/278, 279, 281, 282, 283, 284, 285; 430/496

[56] References Cited

U.S. PATENT DOCUMENTS

| | | | |
|---|---|---|---|
| 818,543 | 4/1906 | Leistenschneider | 354/282 |
| 3,586,501 | 6/1971 | Norquist et al. | 96/29 |
| 4,725,865 | 2/1988 | Hoffman | 354/276 |
| 4,821,054 | 4/1989 | Armbruster et al. | 354/282 |
| 4,821,055 | 4/1989 | Loose et al. | 354/282 |
| 4,994,835 | 2/1991 | Loose et al. | 354/282 |
| 4,994,836 | 2/1991 | Loose et al. | 354/282 |
| 5,223,381 | 6/1993 | Hara et al. | 354/277 |
| 5,337,111 | 8/1994 | Robertson | 354/277 |

FOREIGN PATENT DOCUMENTS

87/01469  3/1987  WIPO ................ G03B 17/26

Primary Examiner—A. A. Mathews
Attorney, Agent, or Firm—Clyde E. Bailey, Sr.

[57] ABSTRACT

An improved photographic film packet (P) has a photosensitive film sheet (F), an elongate carrier sheet (C), a light shielding envelope and a transversely disposed element (30) secured to the carrier (C). The light shielding envelope (E) has a closed leading end portion and a closable trailing end portion (46). The trailing end portion includes lateral edge portions 46a, 46b) The transversely disposed element (30) or clip, being substantially U-shaped, has a vertex (30v) with an interior wall (33) that enables at least the lateral edge portions (46a, 46b) of the trailing end portion (46) of the envelope E to abut thereagainst for closing the trailing end portion (46). In another embodiment of the invention, transversely disposed element (30) is also provided with inward-facing dimples (31d) on at least one segment of first and second flange portions (30a,30b) that project from the vertex (30v). The inward-facing dimples (31d) are positioned for compressive engagement of the first and second opposing walls of the envelope E to further prevent the ingress of light therein.

19 Claims, 10 Drawing Sheets

PHOTOGRAPHIC FILM PACKET AND LIGHT LOCKING ELEMENT

FIELD OF THE INVENTION

The present invention relates generally to film packets, and particularly to such packets that provide for daylight-handling of one or more photosensitive film sheets therein in conjunction with a compatible film holder that is mountable on a photographic camera back.

BACKGROUND OF THE INVENTION

Figure 1:
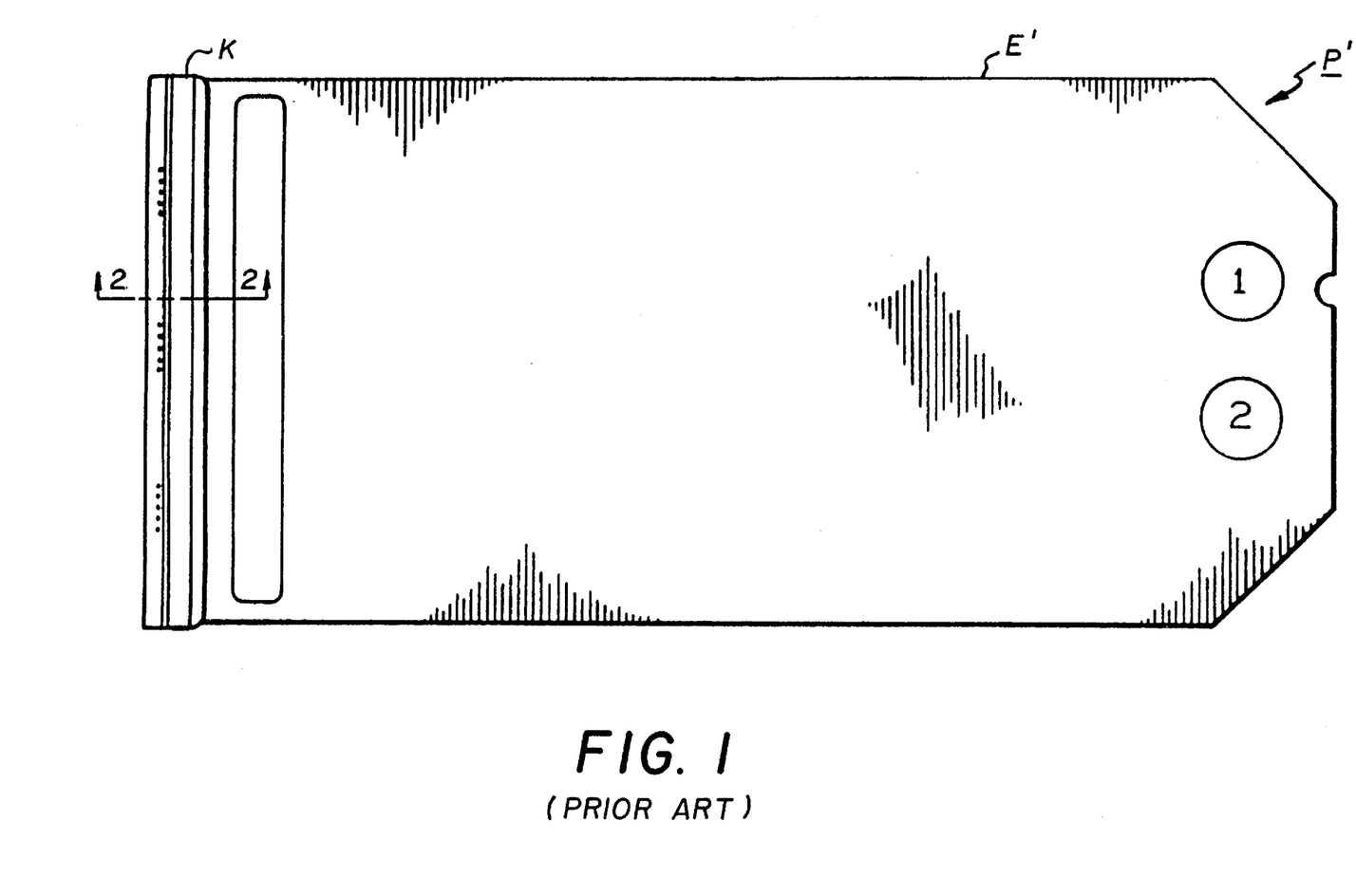
FIG. 1 is a top-plan view of a prior art photographic film packet.
Figure 2:
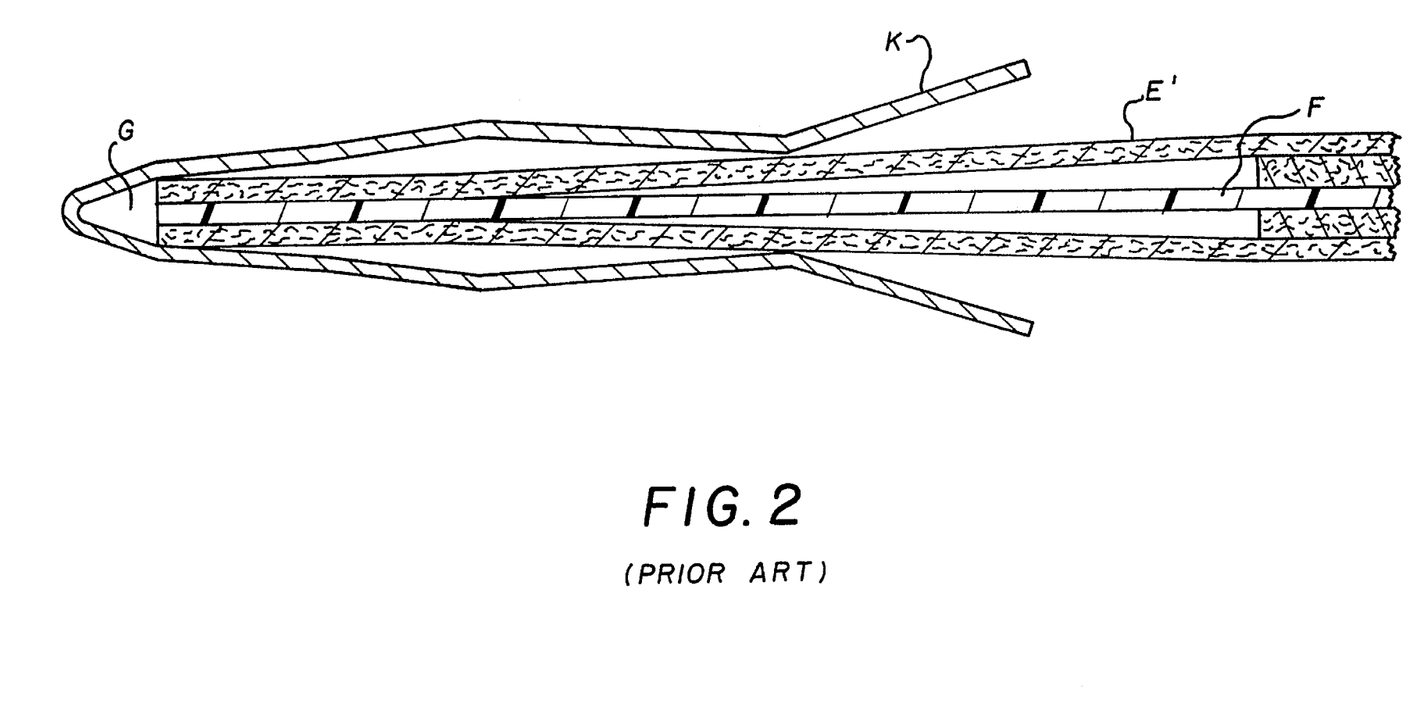
FIG. 2 is a sectional view along the lines 22 of FIG. 1.

Conventional photographic packets for day light loading generally leak some degree of light into a light shielding envelope enclosing photosensitive film material. Light leakage is objectionable because it may cause damage to the photosensitive film material in the assemblage and, therefore, render the film unusable. Typically, in photographic packets P' (FIGS. 1–2), a clip or transversely disposed element K that closes an open end (trailing end section) of a light shielding envelope E enclosing the film is configured such that when the trailing end section of the envelope E' is fully inserted in the clip C, a "gap" G exists between the clip C and the trailing end portion of the envelope. This "gap" G (shown clearly in FIG. 2) provides a passageway for some amount of light to enter the envelope (E) thereby jeopardizing the light integrity of the assemblage. Although the prior art "clip" uses "staking" along a transverse edge to secure a film carrier sheet, there is no provision for eliminating the "gap" as a potential source of light leakage into the light shielding envelope. Moreover, the prior art film packets do not provide additional means for fully utilizing the "clip" or similar member for virtually eliminating the ingress of light into the closable end of the light shielding envelope.

The prior art is replete with film assemblages of the type referred to above. Examples may be found in the following documents:

U.S. Pat. No. 818,543—Discloses a photographic holder (g) in use with an assemblage comprising a film sheet (a) mounted on a carrier (b) and light-tightly enclosed by a withdrawable envelope (f); the assemblage has a manually graspable end portion extending outside the holder, where a medial part, but not the two lateral parts, of the enclosed carrier end is cut back to permit (by selective grasping) withdrawal of either the envelope alone or the whole assemblage.

U.S. Pat. No. 3,586,501—Discloses a self-processable film assemblage (10) in use with a film holder (32), the assemblage comprising a photosensitive film sheet (26) having at one end a transversely disposed "clip" (20) for closing a mating open end (12a) of a light-excluding envelope (12) telescopically received over the film sheet, the clip being adapted for selective engagement and disengagement by a latch (42) in the holder to prevent and permit, respectively, film sheet movement with the envelope when an externally accessible closed end (12b) thereof is pulled away from the holder, the closed end (12b) terminating in a pair of laterally offset graspable tabs (22,24) extending respectively from opposing walls (14,16) of the envelope, the film sheet (26) having a leader (50) extending therefrom toward the envelope closed end (12b) with a recessed end portion (50a) provided to allow only the envelope to be grasped and pulled from the holder, the envelope also having a stop-strip (46) transversely disposed thereon near its open end (12a) and engageable by another latch (48) in the holder to limit outward movement of the envelope.

International Patent Publication No. WO 87/10469—Discloses a photographic film holder (47), the assemblage comprising a carrier (1) having twin film sheets (2) removably mounted on opposite faces of a film-carrying region (3) thereof, with an elongate, narrow tab portion (6) extending longitudinally from one end of the film-carrying region and a rigid, light-sealing "clip" (8) disposed transversely over both carrier faces at the opposite end, together with a light-excluding envelope (14) having an open end (15) that is telescopically slidable over the carrier and film sheets into light-sealing engagement with the clip and a closed end (20) that both conformably encloses and extends beyond the carrier tab portion (6), so that (by selective grasping) either the envelope alone may be pulled away from the carrier and film sheets or the whole assemblage may be pulled together, the clip (8) being engageable by a cooperating tab (43) in the holder to prevent the carrier and film sheets from moving when only the envelope is to be withdrawn, the envelope also having a pair of stops-trips (14a) disposed transversely on both walls thereof near its open end (15), and engageable with a cooperating stop (43a) in the holder, to limit the extend of envelope withdrawal when either film sheet is to be exposed.

U.S. Pat. No. 4,821,054—Discloses a photographic film assemblage that has film carrier having an asymmetrical tab bearing adhesive material and , at an opposite end, a transverse light locking element. Telescopically receivable over the carrier and film is a light shielding envelope. The envelope has an closable end that is closed with the light locking element.

While such film packets may have proven useful for their respective purposes, there has remained a need for an improved film packet so constructed and configured that a film sheet therein cannot inadvertently be exposed by unintended relative movement between its light-excluding parts, especially during handling and transport of the film packet either before or after intended exposure in associated photographic apparatus.

SUMMARY OF THE INVENTION

Accordingly, a primary object of this invention is to meet the foregoing need for such an improved film packet. Another object is to do so in an effective, yet economical and convenient, manner. Those and other objects have been achieved by the invention herein claimed.

This invention finds utility in a photographic film packet comprising a photosensitive film sheet having leading and trailing ends and an elongate carrier sheet having first and second outward-facing surfaces, the carrier sheet including leading and trailing end sections and an intermediate section between the end sections. The film sheet is detachably attached to the first outward-facing surface of the intermediate section with its leading and trailing ends oriented toward the leading and trailing end sections respectively. The leading end section extends longitudinally beyond the intermediate section. The trailing end section extends longitudinally beyond the intermediate section and has a transversely disposed element secured thereto. Removably enclosing both the film sheet and the carrier sheet is a light-shielding envelope having first and second inward-facing surfaces overlying the first and second outward-facing surfaces respectively, the envelope including longitudinally extending leading and trailing end portions overlying the leading and trailing end sections respectively. The leading end portion is sealed closed, while the trailing end portion having lateral edge portions is closable by cooperative engagement with the transversely disposed element. The transversely disposed element is substantially U-shaped, having a vertex defining a closed end section. The closed end section has an interior wall. Generally diverging first and second flange portions project from the vertex defining an open end section. Moreover, first and second flange portions each has a plurality of angular portions. In this embodiment of the invention, at least the lateral edge portions of the trailing end portion of the envelope is fully insertable in the open end portion of the transversely disposed element, i.e., the lateral edge portions abut against the interior wall of the closed end section, for providing a light-lock closure of the trailing end portion.

In another aspect of the invention, an improved film packet has the same features, as described above, and wherein at least one of the angular portions on each of the first and second flange portions comprises a plurality of opposed inward-facing dimples for compressive engagement of the first and second opposing walls of the envelope thereby preventing the ingress of light therein.

In still another embodiment of the invention, a clip or light-locking element is provided for preventing the ingress of light into a light shielding enclosure having first and second opposing walls, and a closed lead end portion and closable trailing end portion. The clip comprises the features of the transversely disposed element described above; and, it also interacts with the light shielding enclosure in the same manner the transversely disposed element engages the envelope.

This invention, and its objects and advantages, will become more apparent in the detailed description of the preferred embodiment thereof presented hereinbelow.

BRIEF DESCRIPTION OF THE DRAWINGS

In the detailed description of the preferred embodiment of this invention presented below, reference is made to the accompanying drawings, wherein like reference numerals denote like elements, and wherein.

DETAILED DESCRIPTION OF THE INVENTION

Because certain parts of photographic film packets are well known, the following description is directed in particular to those elements forming, cooperating directly with, or relating to, this invention. Elements not specifically shown or described herein are selectable from those known in the relevant art.

Figures 3, 4:
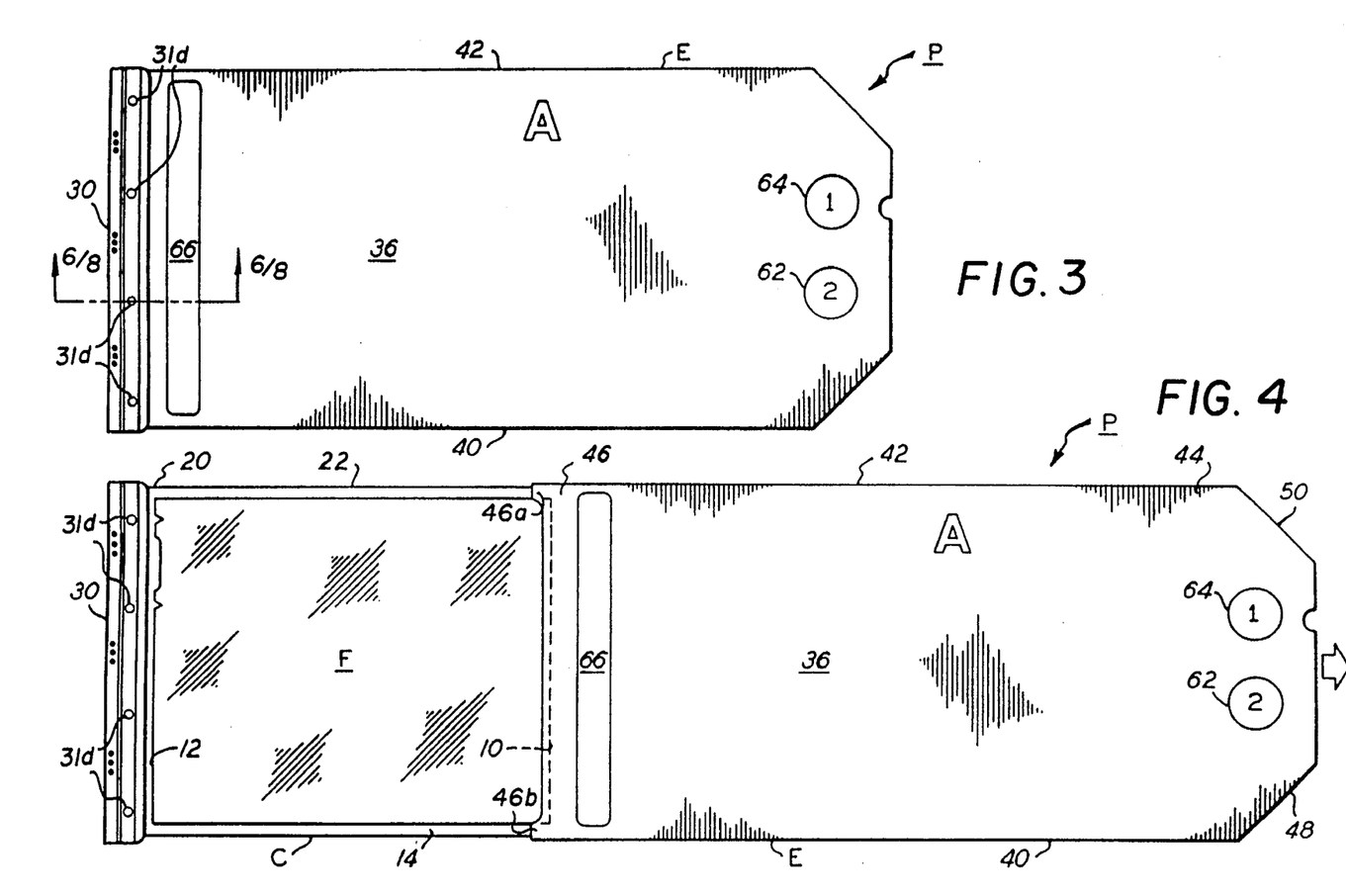
FIG. 3 is a top-plan view of a photographic film packet, constructed and configured in accordance with the preferred embodiment of this invention, showing the packet in its fully assembled and closed condition.
FIG. 4 is a top-plan view of the film packet depicted in FIG. 3, showing a light-shielding envelope thereof as withdrawn from a photosensitive film sheet therein.
Figure 5:
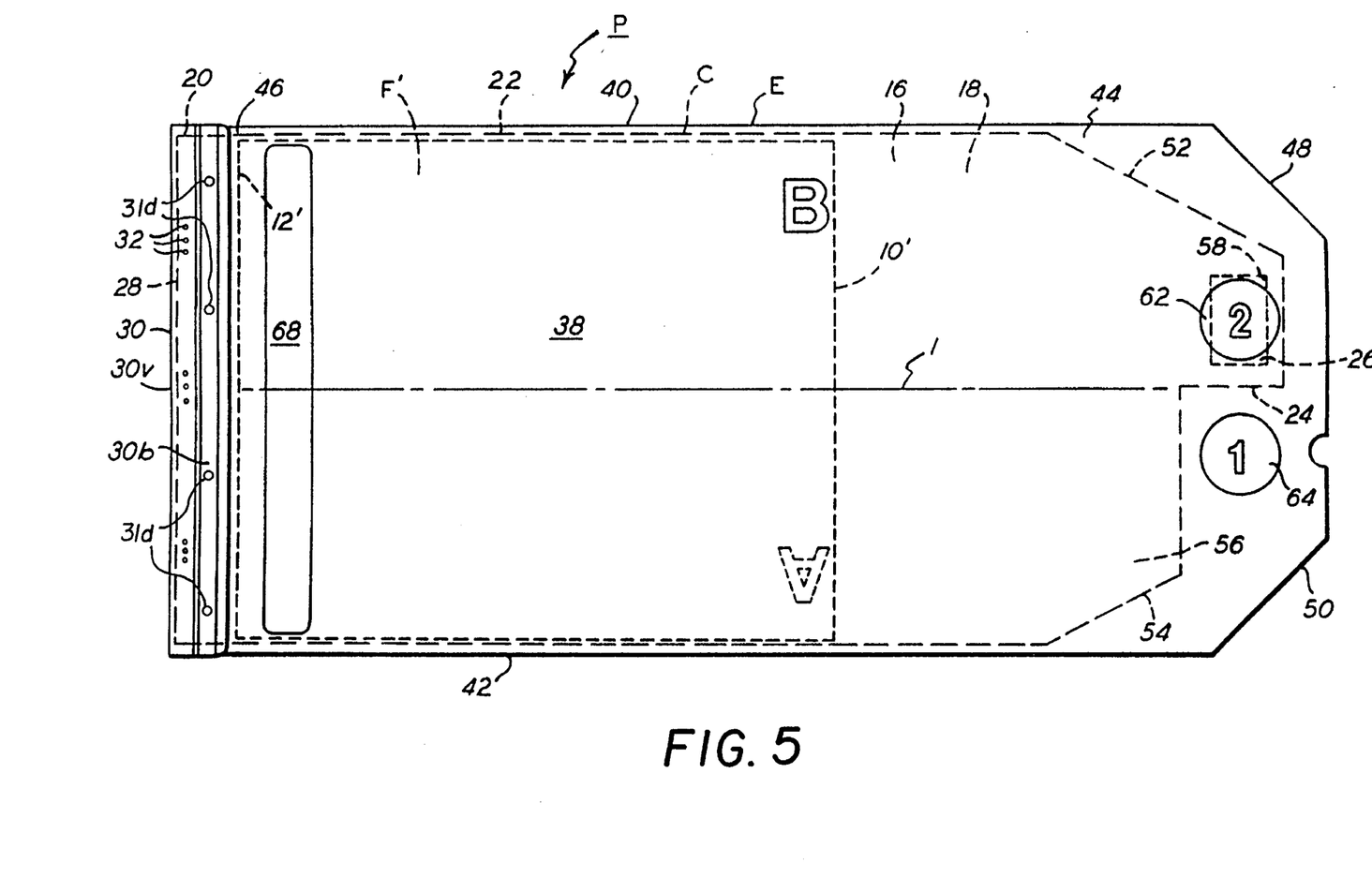
FIG. 5 is an enlarged top-plan view of the film packet of FIG. 3 in its fully assembled and closed condition, showing (via broken lines) the photosensitive film sheet and a carrier sheet therefor as hidden within the light-shielding envelope.
Figure 6:
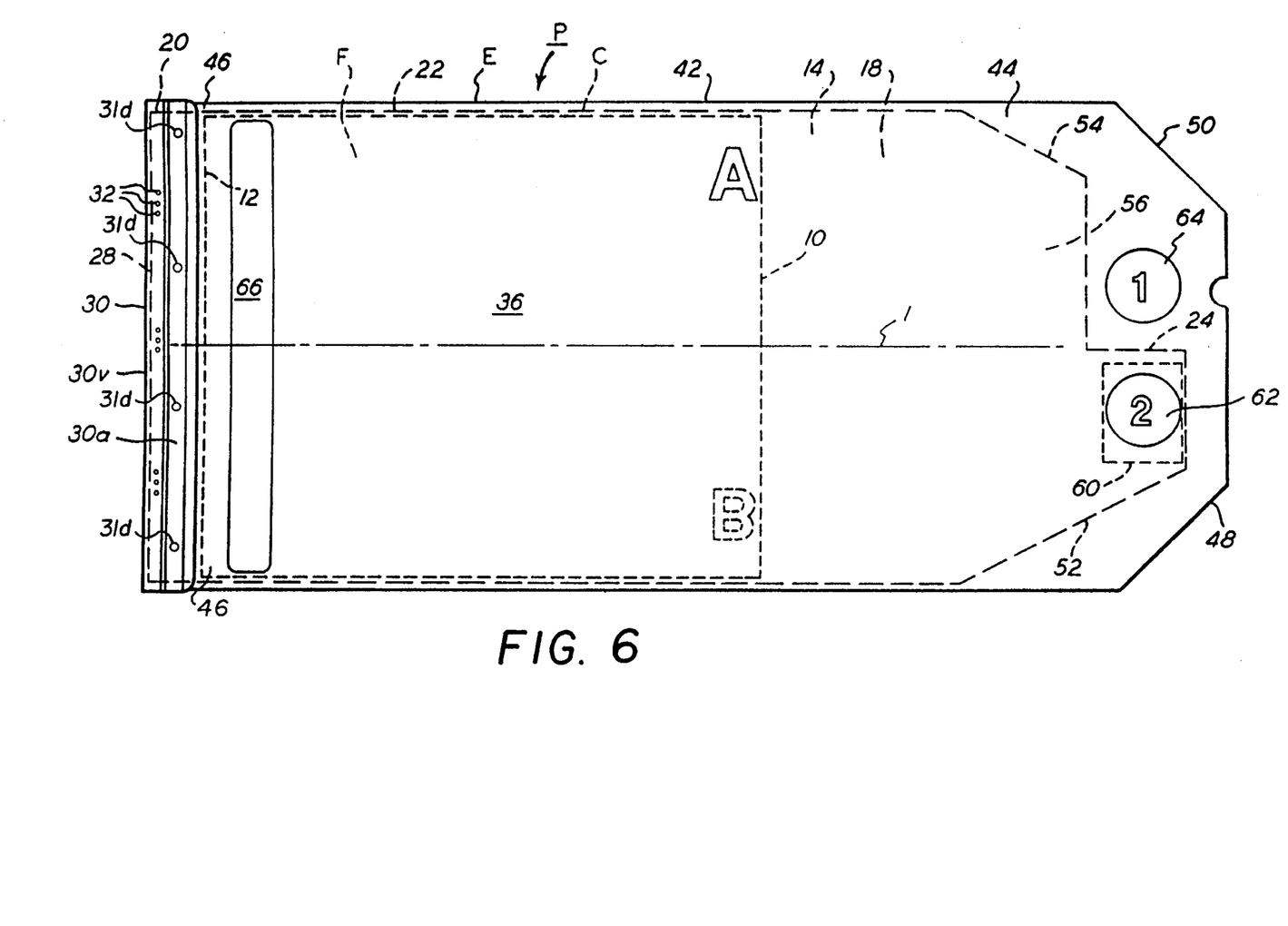
FIG. 6 is an enlarged bottom-plan view similar to FIG. 5 but showing (via broken lines) a second photosensitive film sheet on the other side of the carrier sheet.
Figure 7:
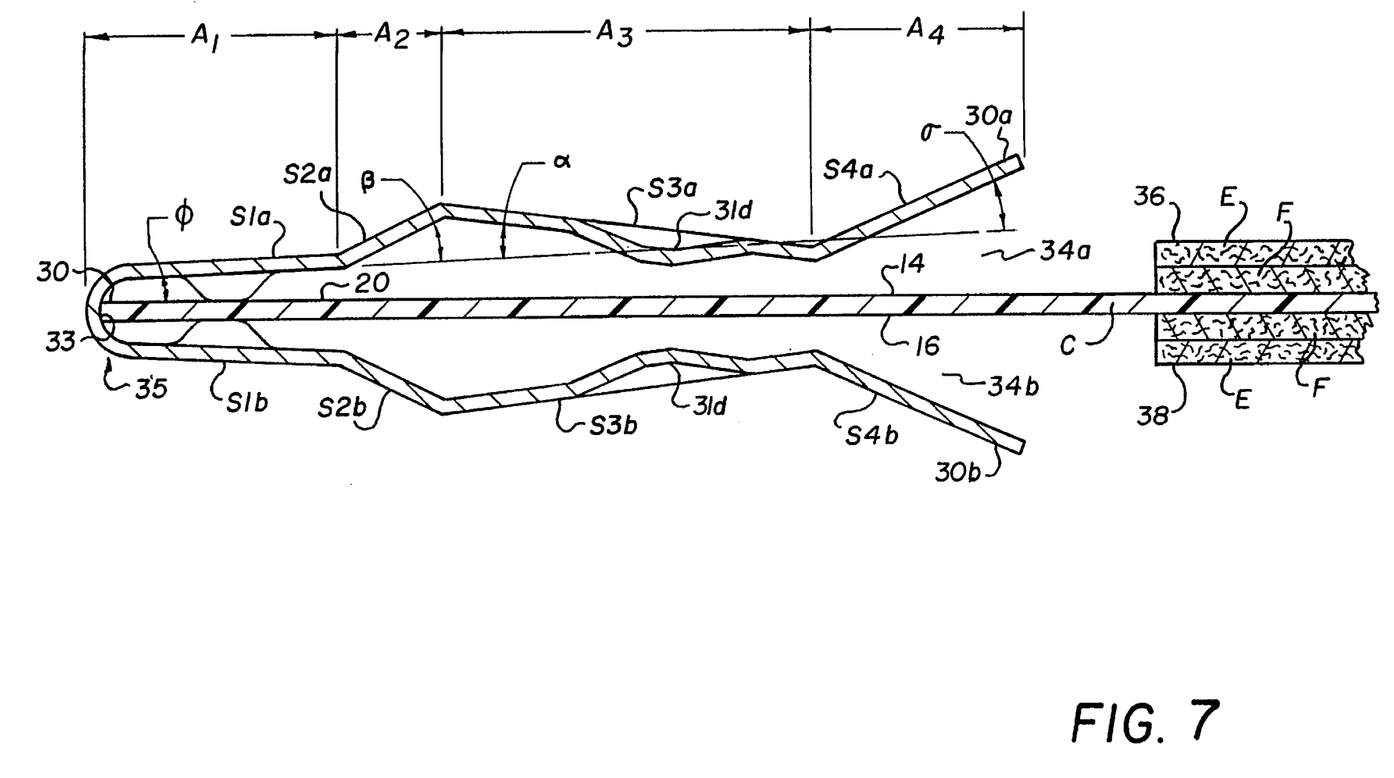
FIG. 7 is a cross sectional view along lines 6—6 of FIG. 3 showing the envelope partially withdrawn from the clip.

FIGS. 3–10 illustrate a photographic film packet, constructed and configured according to the preferred embodiment of this invention. FIGS. 3, 5 and 6 present plan views of such a packet, designated generally therein by the letter P, as it appears when in its fully assembled and closed condition.

FIG. 3 shows only the exteriorly visible components of packet P, as viewed from a first side thereof, including a light-shielding envelope E made of cardboard or other opaque material. As illustrated in FIG. 4, envelope E removably encloses a photosensitive film sheet F having leading and trailing ends 10 and 12, respectively, and an elongate carrier sheet C, to which film sheet F is detachably attached for facilitating use of the film sheet.

FIGS. 5 and 6 present, respectively, top-plan and bottom-plan views of packet P, FIG. 5 showing the first side thereof seen in FIG. 3, and FIG. 6 showing the opposite, or second side. It will thus be seen in FIGS. 5 and 6 that carrier sheet C (shown in broken lines) has first and second outward-facing surfaces 14 and 16 respectively. The carrier sheet includes leading and trailing end sections 18 and 20, respectively, and an intermediate section 22 between the two end sections. As seen in FIG. 6, film sheet F is detachably attached to the first outward-facing surface 14 of intermediate section 22, with its leading and trailing ends 10 and 12 respectively oriented toward the leading and trailing end sections 18 and 20. Similarly, as seen in FIG. 5, a second photosensitive film sheet F' is detachably attached to the second outward-facing surface 16 of intermediate section 22, with its leading and trailing ends 10' and 12' respectively oriented toward leading and trailing end sections 18 and 20.

Leading end section 18 extends longitudinally beyond intermediate section 22 (to the right, as viewed in FIGS. 5 and 6) and terminates in a tab 24 projecting therefrom as shown. Trailing end section 20 extends longitudinally beyond intermediate section 22 (to the left, as viewed in FIGS. 5 and 6) and includes a transverse edge 28, along which is secured a transversely disposed light-locking element 30. Element 30 may be secured to end section 20 by crimping it thereto, as illustrated by the three series of stakings 32 extending parallel with, and adjacent to, edge 28. Stakings 32 are arranged along edge 32 so as to not interfere with the closure of envelope E, as described in details below.

As shown in FIGS. 7–11, the light-locking element 30 is substantially U-shaped in cross section, having a vertex 30v with generally diverging first and second flange portions 30a and 30b projecting angularly therefrom over the first and second outward-facing surfaces 14 and 16, respectively, of end section 20. When end section 20 is inserted into element 30, first and second recesses 34a and 34b are defined, respectively, between flange portions 30a and 30b and the outward-facing surfaces 14 and 16 of end section 20.

Light-shielding envelope E comprises first and second opposing walls 36 and 38, respectively, which are joined along their lateral edges 40 and 42 to provide a sleeve-like enclosure for receiving the carrier sheet and attached film sheets. The opposing interior surfaces of walls 36 and 38 comprise first and second inward-facing surfaces 36' and 38' that respectively overlie the first and second outward-facing surfaces 14 and 16 of carrier sheet C received therebetween.

The envelope further includes longitudinally extending leading and trailing end portions 44 and 46 that respectively overlie the leading and trailing end sections 18 and 20 of the carrier sheet. Leading end portion 44 is sealed closed along its outer edges, and its corners are beveled as shown at 48 and 50. Trailing end portion 46 by itself is left open to permit insertion and withdrawal of the carrier sheet and film sheets therethrough; but when those sheets are fully inserted as shown in FIGS. 3, 5, 6 and 8–10, end portion 46 is closed by entry thereof into recesses 34a and 34b and compressive engagement with flange portions 30a and 30b of light-locking element 30. In the preferred embodiment of the invention, compressive engagement of flange portions 30a and 30b onto first and second opposing walls 36,38 sufficient to completely block the leakage of light into the envelope E is achieved by providing a series of opposing inward-facing dimples 31d regularly arranged along at least one segment of flange portions 30a, 30b, as described in details below. Dimples 31d could be on one segment only of either flange portion 30a or 30b for engaging either first or second opposing wall 36,38 of envelope E, although opposing dimples 31d are preferred for maximum desirable light protection. The dimples 31d are spaced so as not to interfere with the insertion of the lateral edge portions 46a,46b of the envelope E. Moreover, because the angular curvature 30v of the closed section 35 of transverse element 30 is conformed to fully receive lateral edge portions 46a,46b of trailing end portion 46, the lateral edge portions 46a,46b are able to seat intimately against the interior wall 33 of the closed end section 35 and conform therewith. Consequently, the lateral edge portions 46a,46b form a light blocking relationship with the closed end section 35 against light which would otherwise enter through the "gap" of the prior art arrangements (see FIG. 2).

According to FIGS. 7–11, in the preferred embodiment of the invention, the substantially U-shaped transversely disposed element 30 or clip, as indicated above, comprises generally diverging first and second flange portions 30a,30b that project from the vertex (30v). The first and second flange portions 30a,30b each has a plurality of angular portions $(A_1, A_2, A_3, A_4)$. At least one of the angular portions $(A_1, A_2, A_3, A_4)$ on each said first and second flange portions 30a,30b includes a plurality of opposed inward-facing dimples 31d for compressive engagement of the first and second opposing walls 36,38 of the envelope E thereby preventing the ingress of light therein. Dimples 31d are preferably arranged co-linearly along a corresponding segment of flange portions 30a,30b for best results. The lateral edge portions 46a,46b of closable trailing end portion 46 of the envelope E are insertable into the open end portion 34a,34b of the element 30. When fully inserted, lateral end section 46a,46b therefore abut against the interior wall 33 of the closed end section 35 thereby providing a light-lock closure of the trailing end portion 46.

In a preferred embodiment of the invention, enhanced cooperative engagement of the transverse disposed element 30 and the film packet P is achieved when the carrier C has a thickness in the range of about 0.009 inches (0.023 cm) to about 0.011 inches (0.028 cm); and, the lateral edge portions 46a,46b of the envelope E has a thickness in the range of about 0.018 inches (0.046 cm) to about 0.033 inches (0.084 cm). A preferred overall thickness of film packet P including carrier C and lateral edge portions 46a,46b of the envelope is about 0.027 inches (0.069 cm). In this embodiment, according to FIGS. 8 and 11, a first angular portion $A_1$ of the transversely disposes element 30, comprises an angle $\phi$ defined relative to a centerline passing through the vertex (v). According to test performed by the inventors, $\phi$ may be in the range from about 11.5° to about 15.5°, preferably about 13.5° for maximum compressibility of the dimples 31d on the first and second opposing walls of the envelope E. At this point, the envelope E once inserted will not leak light through the clip 30. Moreover, the first angular portion $A_1$ further comprises a pair of generally diverging first segments $S_{1a}$, each first segment $S_{1a}$, $S_{1b}$ having a length $L_1$ in the range from about 0.092 inches (0.234 cm) to about 0.102 inches (0.259 cm), preferably about 0.097 inches (0.246 cm).

Further, in the preferred embodiment, second angular portion $A_2$ (FIGS. 8 and 11) is provided on each of said first and second flange portions 30a,30b. The second angular portion $A_2$ comprises an angle D defined relative to the first diverging segments, wherein D may be in the range from about 22° to about 26°, preferably about 24°. The second angular segment $A_2$ further comprises a pair of generally diverging second segments $S_{2a}$, $S_{2b}$, each second segment $S_{2a}$, $S_{2b}$ having a length $L_2$ in the range from about 0.032 inches (0.081 cm) to about 0.042 inches (0.107 cm), preferably about 0.037 inches (0.094 cm). Test results indicate that the maximum dimple 31d compressibility is related to these valves.

Figure 8:
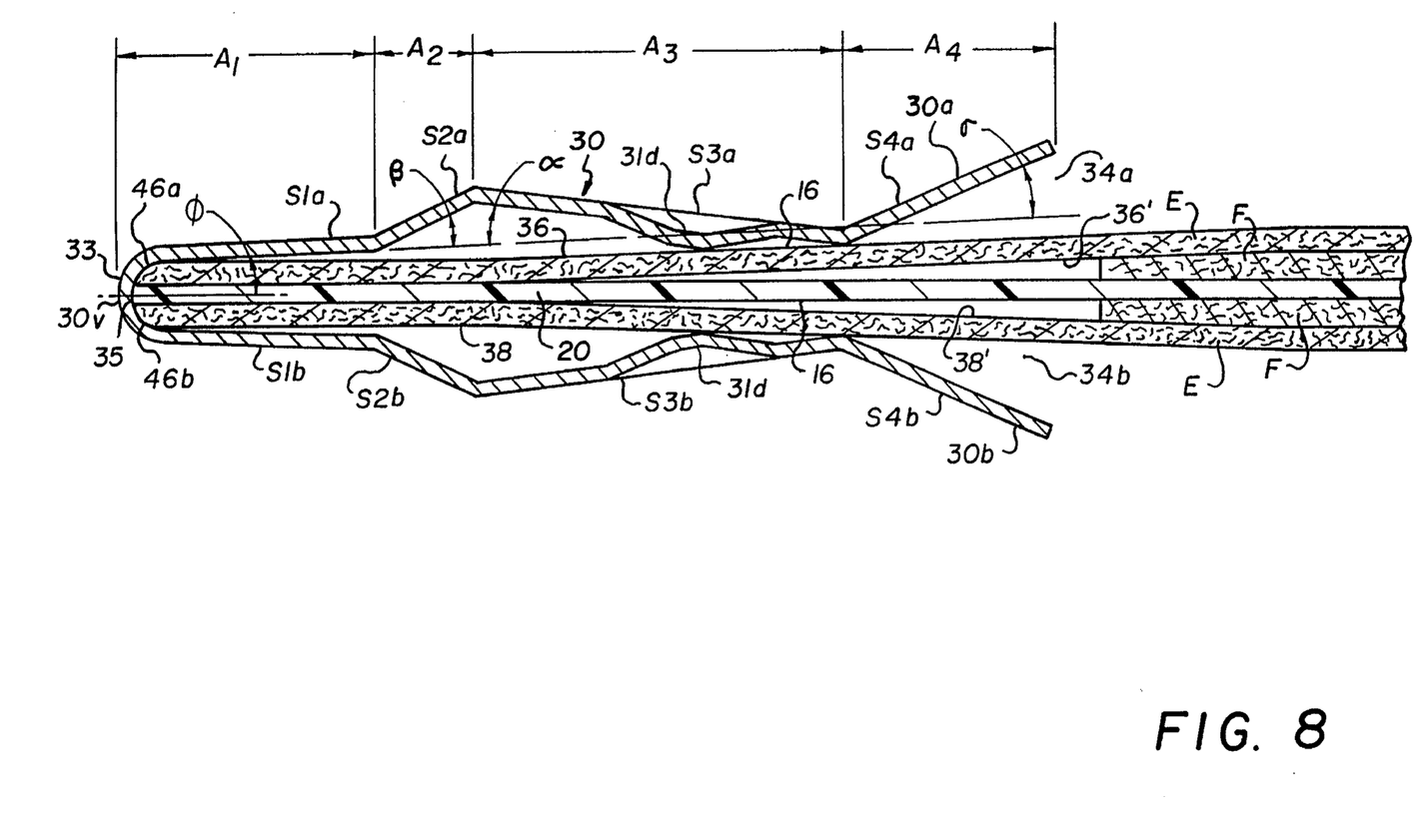
FIG. 8 is a cross sectional view along lines 8—8 of FIG. 3 showing the envelope fully inserted in the clip.
Figure 9:
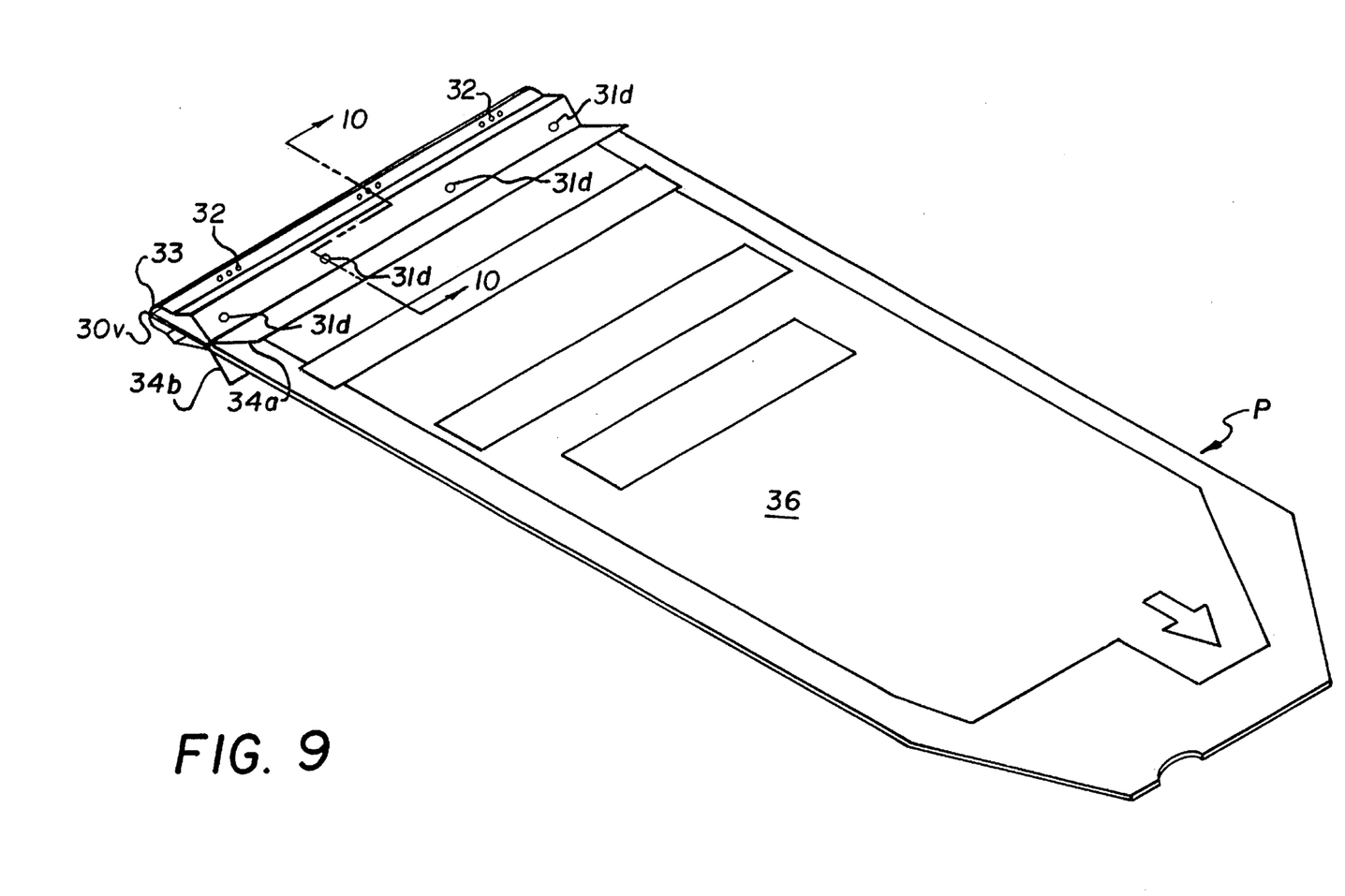
FIG. 9 is an isometric view of the film packet.
Figure 10:
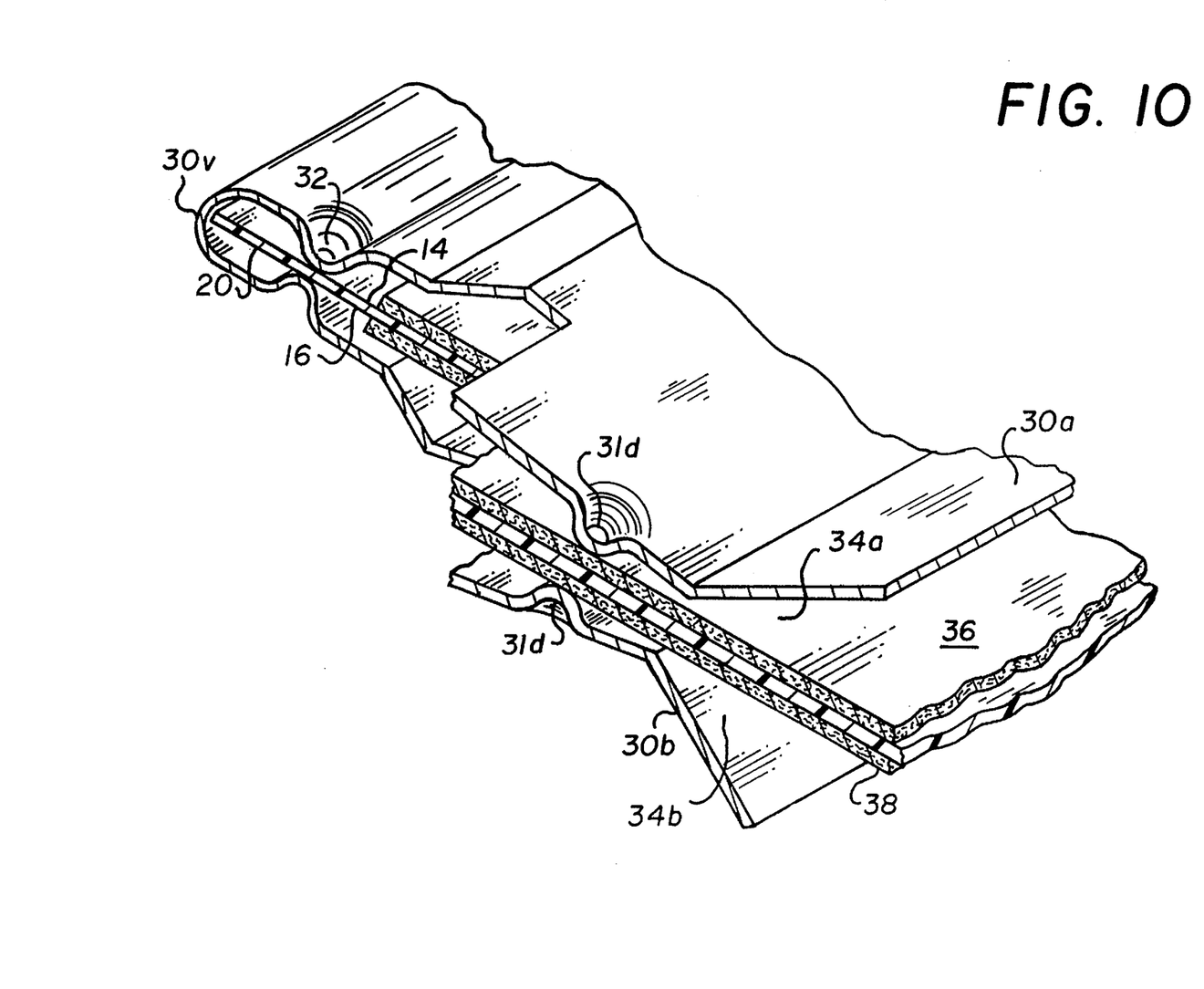
FIG. 10 is an fragmentary perspective view along lines 10—10 of FIG. 8.
Figure 11:
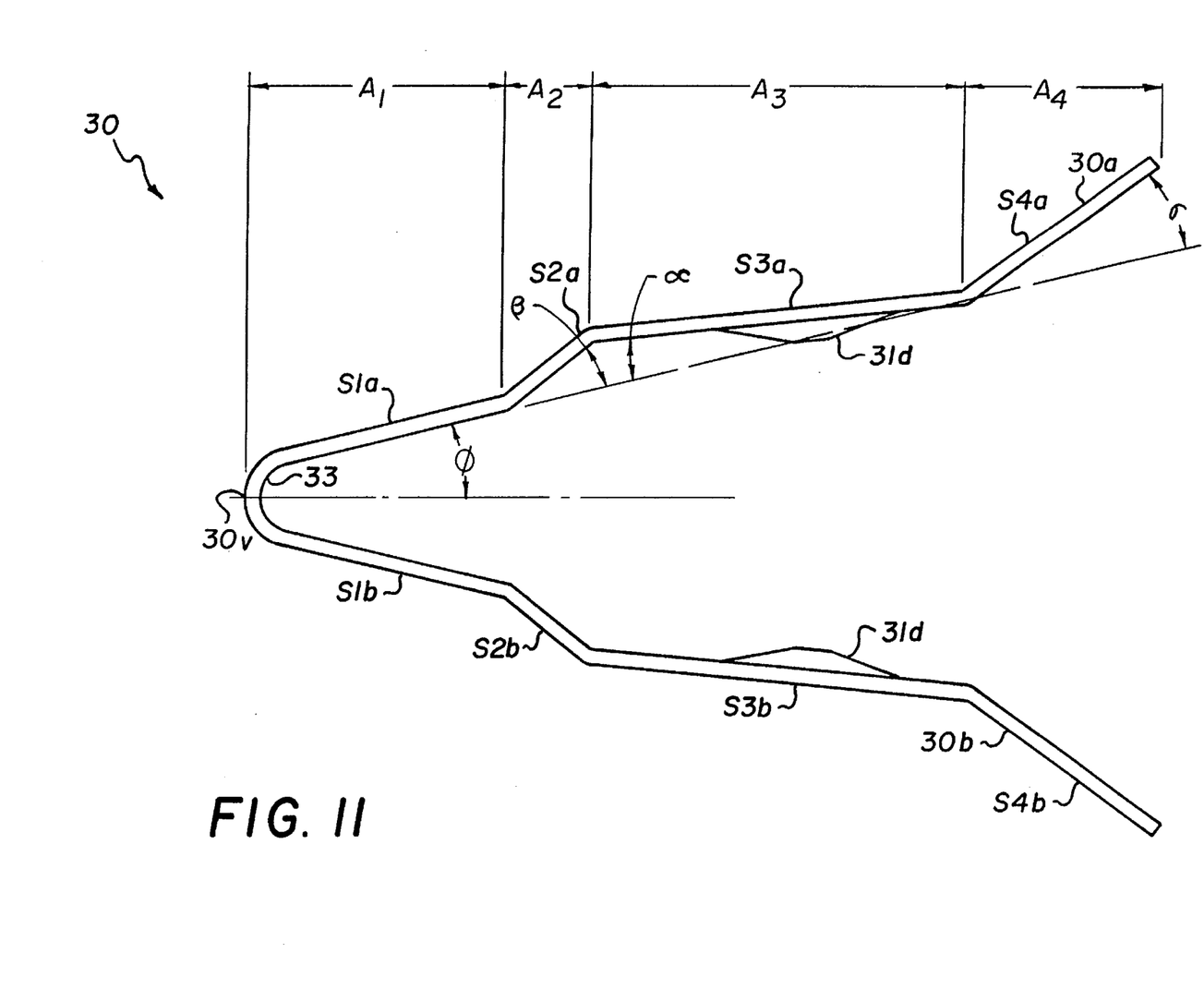
FIG. 11 is an elevational view of the clip or element of the invention.

Moreover, in the preferred embodiment of the invention, a third angular portion $A_3$ comprises an angle $\alpha$ defined relative to the diverging first segments $S_{1a}$, $S_{1b}$. According to test results obtained by the inventors, $\alpha$ may be in the range from about 6° to about 10°, preferably about 8° for enabling the dimples 31d to impart maximum compressibility on the envelope E. The third angular segment $S_{3a}$, $S_{3b}$ further comprises a pair of generally converging third segments $S_{3a}$, $S_{3b}$, each third segment $S_{3a}$, $S_{3b}$ having a length $L_3$ in the range from about 0.127 inches (0.323 cm) to about 0.037 inches (0.094 cm), preferably about 0.132 inches (0.335 cm).

Furthermore, in the preferred embodiment of the invention, a fourth angular portion $A_4$ (FIG. 11) on each of said first and second flange portions 30a,30b comprises an angle $\sigma$ defined relative to said diverging first segments $S_{1a}$, $S_{1b}$. According to test results obtained by the inventors, when $\sigma$ is in the range of from about 20° to about 24°, preferably about 22°, the fourth angular portion $A_4$ cooperates optimally with the first, second and third angular portions $A_1, A_2, A_3$ to apply maximum compressible pressure on the envelope. The fourth angular portion $A_4$ further comprises a pair of generally diverging fourth segments $S_{4a}$, $S_{4b}$, each fourth segment $S_{4a}$, $S_{4b}$ having a length $L_4$ in the range from about 0.075 inches (0.191 cm) to about 0.085 inches (0.216 cm), preferably about 0.080 inches (0.203 cm).

To facilitate insertion of the carrier and film sheets through end portion 46 and fully into the envelope, the carrier sheet leading end section is beveled as shown at 52 and 54, and the two film sheets F and F' are detachably attached to the carrier sheet at their leading ends 10 and 10'. Also, to facilitate detaching the film sheets from the carrier sheet after withdrawal from the envelope, each film sheet is detachably attached only at its leading end, so that its trailing end and image area can be easily lifted from the carrier sheet and its leading end then peeled off.

As shown in FIGS. 3–6, the envelope first and second walls 36 and 38 have pair of movement-limiting elements, or stop strips, 66 and 68 transversely disposed on their exterior surfaces near the envelope trailing end portion 46. Strips 66 and 68 may be made of cardboard or plastic and adhered or sealed to their respective envelope wall surfaces. Their thickness or height above those surfaces must be sufficient to be readily engageable by one or more cooperating members in a compatible film packet holder such as that described in U.S. Pat. No. 4,821,054.

The present invention has now been described in detail with particular reference to its preferred embodiment as illustrated herein. It will be understood, however, that variations and modifications can be effected within the spirit and scope of this invention.

Parts List

| | |
|---|---|
| Packet | P |
| Envelope | E |
| First Film Sheet | F |
| Second Film Sheet | F' |
| Carrier Sheet | C |
| First Angular Portion | $A_1$ |
| Second Angular Portion | $A_2$ |
| Third Angular Portion | $A_3$ |
| Fourth Angular Portion | $A_4$ |
| First Segments | $S_{1a}, S_{1b}$ |
| Second Segments | $S_{2a}, S_{2b}$ |
| Third Segments | $S_{3a}, S_{3b}$ |
| Fourth Segments | $S_{4a}, S_{4b}$ |
| Leading End | 10, 10' |
| Trailing End | 12, 12' |
| First Outward-Facing Surface | 14 |
| Second Outward-Facing Surface | 16 |
| Leading End Section | 18 |
| Trailing End Section | 20 |
| Intermediate Section | 22 |
| Tab | 24 |
| Adhesive Surface | 26 |
| Transverse Edge | 28 |
| Light-locking Element | 30 |
| First Flange Portion | 30a |
| Second Flange Portion | 30b |
| Vertex | 30v |
| Dimples | 31d |
| Stakings | 32 |
| Interior Wall-Closed End Portion | 33 |
| First Recess | 34a |
| Second Recess | 34b |
| Closed End Section | 35 |
| First Opposing Wall | 36 |
| First Inward-Facing Surface | 36' |
| Second Opposing Wall | 38 |
| Second Inward-Facing Surface | 38' |
| Lateral Edges | 40, 42 |
| Leading End Portion | 44 |
| Trailing End Portion | 46 |
| Extending Sections | 46a, 46b |
| Beveled Corners | 48, 50 |
| Beveled Leading End Section | 52, 54 |
| Graspable Zone | 62, 64 |
| Stop Strips | 66, 68 |

We claim:

1. An improved photographic film packet comprising:

a photosensitive film sheet having a leading and trailing end;

an elongate carder sheet having first and second outward-facing surfaces, said carrier sheet including leading and trailing end sections and an intermediate section between said end sections, said film sheet being detachably attached to said first outward-facing surface of said intermediate section with said leading and trailing ends thereof oriented toward said leading and trailing end sections respectively, said leading end section extending longitudinally beyond said intermediate section, said trailing end section extending longitudinally beyond said intermediate section having a substantially U-shaped transversely disposed element secured thereto;

a light shielding envelope removably enclosing said carrier sheet and said film sheet, said envelope comprising first and second opposing walls having first and second inward-facing surfaces overlying said first and second outward-facing surfaces of said carrier sheet, said envelope including longitudinally extending leading and trailing end portions overlying said leading and trailing end sections respectively, said trailing end portion having a lateral edge portion, said leading end portion being sealed closed, said trailing end portion being closable by cooperative engagement of said lateral edge portion with said transversely disposed element; and, wherein said substantially U-shaped transversely disposed element comprises a vertex defining a closed end section having an interior wall, and generally diverging first and second flange portions projecting from said vertex defining an open end section, said first and second flange portions each having a plurality of angular portions, at least one of said angular portions on each said first and second flange portions comprising a plurality of opposed inward-facing dimples for compressively engaging said first and second opposing walls of said envelope thereby preventing the ingress of light therein, and wherein at least the lateral edge portion of said trailing end portion of said envelope, when fully disposed in the open end portion of said element, abuts against said interior wall of said closed end section thereby providing a light-lock closure of the trailing end portion.

2. The film packet recited in claim 1 wherein the carrier has a thickness in the range of about 0.009 inches (0.023 cm) to about 0.011 inches (0.028 cm); and the lateral edge portions of the envelope a thickness in the range of about 0.018 inches (0.046 cm) to about 0.033 inches (0.084 cm).

3. The film packet recited in claim 2 wherein a first angular portion of said transversely disposed element comprises an angle $\phi$ defined relative to a centerline passing through the vertex, wherein $\phi$ is in the range of about 11.5° to about 15.5°, and wherein said first angular portions further comprise a pair of generally diverging first segments, each first segment having a length $L_1$ in the range of from about 0.092 inches (0.234 cm) to about 0.102 inches (0.259 cm).

4. The film packet recited in claim 3 wherein a second angular portion on each of said first and second flange portions comprises an angle $\beta$ defined relative to said first diverging segments, wherein $\beta$ is in the range from about 22° to about 26°, and wherein said second angular segment further comprises a pair of generally diverging second segments, each second segment having a length $L_2$ in the range from about 0.032 inches (0.081 cm) to about 0.042 inches (0.107 cm).

5. The film packet recited in claim 4 wherein the third angular portion comprises an angle $\alpha$ defined relative to said generally diverging first segments, wherein $\beta$ is in the range from about 6° to about 10°, and wherein said third angular segment further comprises a pair of generally converging third segments, each third segment having a length $L_3$ in the range from about 0.127 inches (0.323 cm) to about 0.137 inches (0.348 cm).

6. The film packet recited in claim 5 wherein a fourth angular portion on each of said first and second flange portions comprises an angle $\sigma$ defined relative to said generally diverging first segments, wherein σ is in the range from about 20° to about 24°, and wherein said fourth angular segment further comprises a pair of generally diverging segments, each said fourth segment having a length $L_4$ in the range of about 0.075 inches (0.191 cm) to about 0.085 inches (0.216 cm).

7. A clip for preventing the ingress of light into a light shielding enclosure having first and second opposing walls, and a closed lead end portion and closable trailing end portion, said trailing end portion having a lateral edge portion, said clip comprising:

a substantially U-shaped element comprising a vertex defining a closed end section having an interior wall, and generally diverging first and second flange portions projecting from said vertex defining an open end section, said first and second flange portions each having a plurality of angular portions, at least one of said angular portions on each said first and second flange portions comprising a plurality of opposed inward-facing dimples for compressively engaging said first and second opposing walls of said light shielding enclosure thereby preventing the ingress of light therein, and wherein at least the lateral edge portion of said trailing end portion of said enclosure, when fully disposed in the open end portion of said element, abuts against said interior wall of said closed end section thereby providing a light-lock closure of the trailing end portion.

8. The clip recited in claim 7 wherein said light shielding envelope has a thickness in the range of about 0.018 inches (0.046 cm) to about 0.033 inches (0.084 cm).

9. The clip recited in claim 8 wherein a first angular portion on each of said first and second flange portions includes an angle φ defined relative to a centerline passing through the vertex, wherein φ is in the range of about 11.5° to about 15.5°, and wherein said first angular portion further comprises a pair of generally diverging first segments, each first segment having a length $L_1$ in the range of from about 0.092 inches (0.234 cm) to about 0.102 inches (0.259 cm).

10. The clip recited in claim 9 wherein the second angular portion comprises an angle β defined relative to said first diverging segments, wherein β is in the range from about 22° to about 26°, and wherein said second angular segment further comprises a pair of diverging second segments, each second segment having a length $L_2$ in the range of about 0.032 inches (0.081 cm) to about 0.042 inches (0.107 cm).

11. The clip recited in claim 10 wherein a third angular portion on each of said first and second flange portions comprises an angle α defined relative to said diverging first segments, wherein α is in the range of about 6° to about 10°, and wherein said third angular segment further comprises a pair of converging third segments, each third segment having a length $L_3$ in the range of about 0.127 inches (0.323 cm) to about 0.137 inches (0.348 cm).

12. The clip recited in claim 11 wherein the fourth angular portion comprises an angle σ defined relative to said diverging first segments, wherein σ is in the range of about 20° to about 24°, and wherein said fourth angular segment further comprises a pair of diverging fourth segments, each fourth segment having a length $L_4$ in the range of about 0.075 inches (0.191 cm) to about 0.085 inches (0.216 cm).

13. An improved film packet comprising:

a film strip comprising a image portion and a leader portion;

a light shielding envelope removably enclosing at least said image portion of said film strip, said envelope having first and second opposing walls, and a closed leading end portion and a closable trailing end portion, said trailing end portions having a lateral edge portion, said trailing end portion being closable by cooperative engagement of said lateral edge portions with a transversely disposed substantially U-shaped element;

wherein said transversely disposed substantially U-shaped element comprises a vertex defining a closed end section having an interior wall, and generally diverging first and second flange portions projecting from said vertex defining an open end section, said first and second flange portions each having a plurality of angular portions, at least one of said angular portions on each said first and second flange portions comprising a plurality of opposed inward-facing dimples for compressively engaging said first and second opposing walls of said envelope thereby preventing the ingress of light therein, and wherein at least the lateral edge portion of said trailing end portion of said envelope, when fully disposed in the open end portion of said element, abuts against said interior wall of said closed end section thereby providing a light-lock closure of the trailing end portion.

14. An improved photographic film packet comprising:

a photosensitive film sheet having a leading and trailing end portions;

an elongate carrier sheet having first and second outward-facing surfaces, said carrier sheet including leading and trailing end sections and an intermediate section between said end sections, said film sheet being detachably attached to said first outward-facing surface of said intermediate section with said leading and trailing end portions thereof oriented toward said leading and trailing end sections respectively, said leading end section extending longitudinally beyond said intermediate section, said trailing end section extending longitudinally beyond said intermediate section having a substantially U-shaped transversely disposed element secured thereto;

a light shielding envelope removably enclosing said carrier sheet and said film sheet, said envelope having first and second inward-facing surfaces overlying said first and second outward-facing surfaces respectively, said envelope including longitudinally extending leading and trailing end portions overlying said leading and trailing end sections respectively, said trailing end portion having a lateral edge portion, said leading end portion being sealed closed, said trailing end portion being closable by cooperative engagement of said lateral edge portion with said transversely disposed element; and, wherein said substantially U-shaped transversely disposed element comprises a vertex defining a closed end section having an interior wall, and wherein at least the lateral edge portion of said trailing end portion of said envelope, when fully disposed in the open end portion of said element, abuts against said interior wall of said closed end section thereby providing a light-lock closure of the trailing end portion.

15. The film packet recited in claim 14 wherein the carrier has a thickness in the range of about 0.009 inches (0.023 cm) to about 0.011 inches (0.028 cm); and the lateral edge portions of the envelope a thickness in the range of about 0.018 inches (0.046 cm) to about 0.033 inches (0.084 cm).

16. The film packet recited in claim 15 wherein a first angular portion of said transversely disposed element comprises an angle φ defined relative to a centerline passing through the vertex, wherein $\phi$ is in the range of about 11.5° to about 15.5°, and wherein said first angular portions further comprise a pair of generally diverging first segments, each first segment having a length $L_1$ in the range of from about 0.092 inches (0.234 cm) to about 0.102 inches (0.259 cm).

17. The film packet recited in claim 16 wherein a second angular portion on each of said first and second flange portions comprises an angle $\beta$ defined relative to said first diverging segments, wherein $\beta$ is in the range from about 22° to about 26°, and wherein said second angular segment further comprises a pair of generally diverging second segments, each second segment having a length $L_2$ in the range from about 0.032 inches (0.081 cm) to about 0.042 inches (0.107 cm).

18. The film packet recited in claim 17 wherein the third angular portion comprises an angle $\alpha$ defined relative to said generally diverging first segments, wherein $\alpha$ is in the range from about 6° to about 10°, and wherein said third angular segment further comprises a pair of generally converging third segments, each third segment having a length $L_3$ in the range from about 0.127 inches (0.323 cm) to about 0.137 inches (0.348 cm).

19. The film packet recited in claim 18 wherein a fourth angular portion on each of said first and second flange portions comprises an angle $\sigma$ defined relative to said generally diverging first segments, wherein $\sigma$ is in the range from about 20° to about 24° and wherein said fourth angular segment further comprises a pair of generally diverging segments, each said fourth segment having a length $L_4$ in the range of about 0.075 inches (0.191 cm) to about 0.085 inches (0.216 cm).

* * * * *

UNITED STATES PATENT AND TRADEMARK OFFICE
CERTIFICATE OF CORRECTION

PATENT NO. : 5,510,869
DATED : April 23, 1996
INVENTOR(S) : Peter Affolter, et al.

It is certified that error appears in the above-indentified patent and that said Letters Patent is hereby corrected as shown below:

Column 8, line 59 change "$\beta$" to -- $\alpha$ --.

Signed and Sealed this

Sixteenth Day of July, 1996

Attest:

BRUCE LEHMAN

Attesting Officer         Commissioner of Patents and Trademarks